M. W. Ruthven.
Steering Apparatus.
N° 53,934. Patented Apr. 10, 1866.
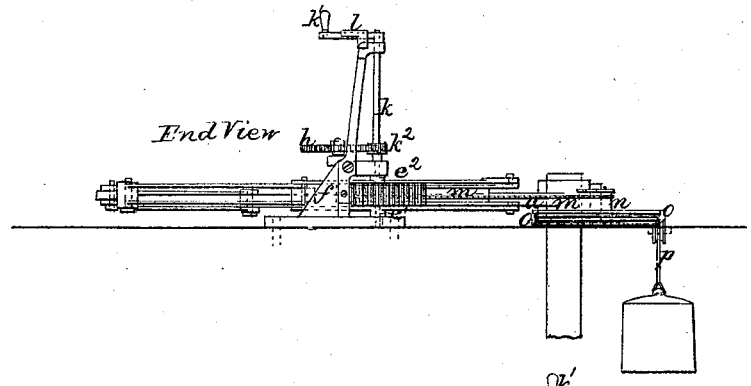
End View
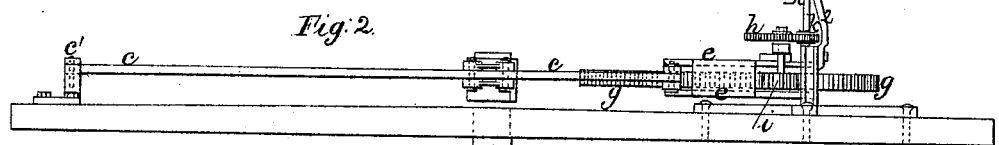
Fig. 2.
Fig. 1.
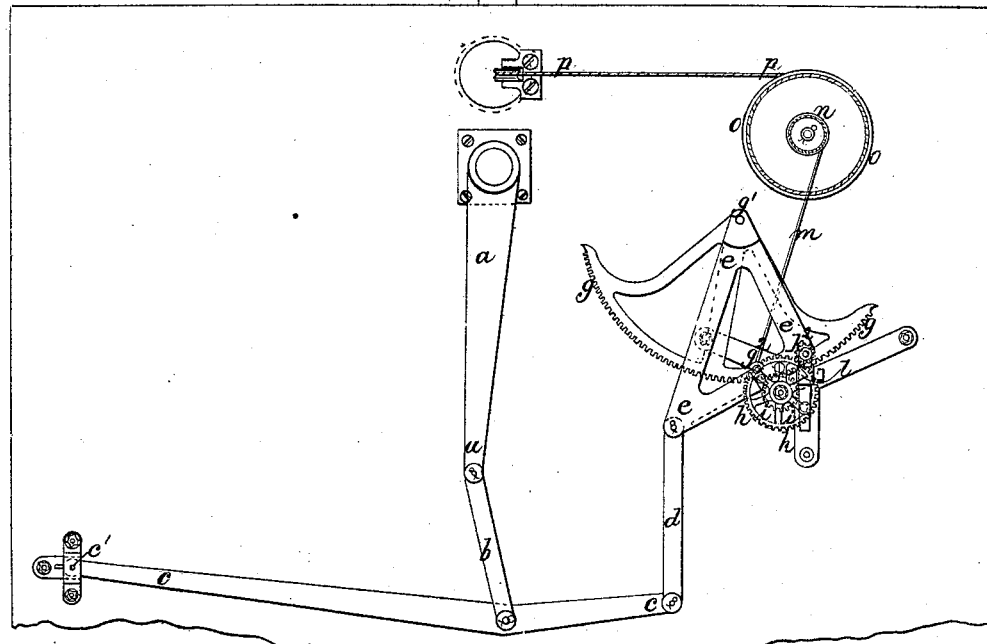
Witnesses
Geo. Pitt
Jno. Alcock
Inventor
M. W. Ruthven

UNITED STATES PATENT OFFICE.

MORRIS WEST RUTHVEN, OF MIDDLESEX COUNTY, ENGLAND.

IMPROVED STEERING APPARATUS.

Specification forming part of Letters Patent No. 53,934, dated April 10, 1866.

*To all whom it may concern:*

Be it known that I, MORRIS WEST RUTHVEN, of Harlow Villas, East India Road, in the county of Middlesex, England, engineer, a subject of the Queen of Great Britain, have invented or discovered new and useful Improvements in Steering Apparatus; and I, the said MORRIS WEST RUTHVEN, do hereby declare the nature of the said invention and in what manner the same is to be performed to be particularly described and ascertained in and by the following statement thereof—that is to say:

This invention has for its object improvements in steering apparatus; and it consists in the application of apparatus to a rudder in such manner that the pressure of the water in bringing the rudder back into a line with the keel shall be stored for use and applied to aid the steersman when again putting over the rudder. For this purpose I prefer to employ a lever connected by a suitable connecting rod or link to the tiller, such lever turning on a fulcrum or axis at one end and having the weight or spring attached to the other end. The action of the weights or springs on the tiller may be arranged to be constant whatever be the speed of the ship or vessel; or, as is preferred, provision is made in order that the weights or springs may offer a greater power in aid of the steersman when a ship is moving through the water quickly than when it is moving slowly through the water, and such adjustment may be made by varying the leverage from time to time as required. In all cases the effect of the weights or springs used should be somewhat less than the pressure of water on the rudder, in order that the pressure of the water on the rudders may be capable of lifting the weights or of compressing the springs.

Figure 1 is a plan, and Fig. 2 a side view, of the apparatus arranged in the manner I prefer.

$a$ is the tiller on the rudder-head. $b$ is a link connecting it with the lever $c$, working on a fixed center at $c'$. The farther end of this lever is connected by the rods $d$ to the lever $e$, which is centered at $e'$ $e'$ to the standard $f$. This lever, it will be seen, is made double, and between the two parts is fitted the toothed arc $g$, which is centered to the lever $e$ at $g'$. $h$ is a spur-wheel carried in bearings on the lever and having on its axis a pinion, $i$, which gears with the toothed arc $g$.

$k$ is an axis with a handle, $k'$, at its upper end and a pinion, $k^2$, at its lower. When the handle $k'$ is turned with its axis it works the train of gearing $k^2$, $h$, and $i$, and so gives motion to the toothed arc $g$.

$l$ is a clutch for securing the handle $k'$ when the arc $g$ has been properly set.

$m$ is a cord or chain attached to the arc $g$ at the point $g^2$ by one end, and at the other end it is fixed to the small drum $n$, on which it winds.

$o$ is a larger drum fixed to the small drum $n$, and having another cord or chain, $p$, winding upon it, and to the farther end of this cord or chain a weight or spring is attached.

When the apparatus is in action the lever $e$ and arc $g$ are firmly locked together by securing the handle $k'$, so that strain on the cord $m$ tends to draw the point $g^2$ toward the drum $n$, and the apparatus being set, as is shown in in the drawings—that is to say, suitably for going ahead—the lever $c$ is constantly drawn inward toward the tiller, and thus the tendency of the weight or spring is constantly to force the tiller over toward the side to which it for the moment inclines. If by turning the arc $g$ the point $g^2$, where the cord or chain is attached, is brought nearer to the center $e'$, on which the lever $e$ turns, the force with which the weight or spring acts on the tiller will be diminished; or if, by further traversing the arc $g$, the point $g'$ is brought to the other side of the center $e'$, then, as will be seen, the weight or spring will tend constantly to force the lever $c$ away from the tiller, which thus will be drawn toward a midship position. The apparatus is then set for going astern.

If a spring is employed, it may be of steel or other metal, or it may be of condensed air, which may be arranged to act directly on a piston or indirectly by having water or other fluid interposed between the piston and compressed air contained in a suitable vessel.

When using compressed air acting with an interposed fluid the pressure of the air may be readily varied by the aid of a small forcepump and a valve to allow the escape of the air from the vessel containing the condensed air and fluid.

What I claim is—

In combination with a tiller operated by gears, pivoted levers, and links, substantially as herein described, a weight or spring which reserves or stores the power with which the water forces the rudder in one direction and is applied to aid the helmsman in putting the rudder over in an opposite direction, substantially as set forth.

M. W. RUTHVEN.

Witnesses:
  GEO. PITT,
  JNO. ALCOCK.